United States Patent
Whang et al.

(10) Patent No.: US 8,296,306 B1
(45) Date of Patent: Oct. 23, 2012

(54) LINEAR-TIME TOP-K SORT METHOD

(75) Inventors: Kyu-Young Whang, Daejeon (KR); Min Soo Kim, Daejeon (KR); Jeong-Hoon Lee, Daegu (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 13/304,800

(22) Filed: Nov. 28, 2011

(51) Int. Cl.
*G06F 7/00* (2006.01)

(52) U.S. Cl. .................................... 707/752

(58) Field of Classification Search ............. 707/752
See application file for complete search history.

(56) References Cited

OTHER PUBLICATIONS

Yi et al., Efficient Processing of Top-k Queries in Uncertain Databases with x-Relations, IEEE Transactions on Knowledge and Data Engineering, vol. 20, No. 12, pp. 1669-1682, Dec. 2008.*
Yu et al., Processing a Large Number of Continuous Preference Top-k Queries, SIGMOD '12, pp. 397-408, May 2012.*
Haghani et al., Evaluating Top-k Queries over Incomplete Data Streams, CIKM '09, pp. 877-886, Nov. 2009.*
Ilyas et al., "A Survey of Top-k Query Processing Techniques in Relational Database Systems", ACM Computing Surveys, 2008, vol. 40, No. 4, Article 11, pp. 1-61.
Robert Sedgewick, "Algorithms in C++", Addison Wesley, 1992, pp. 93-131 and 145-176.
Horowitz et al., "Fundamentals of Data Structures in C++", W. H. Freeman and Company, 1995, pp. 279-287 and 414-418.
Mikkel Thorup, "Equivalence between Priority Queues and Sorting", Proceedings of the 43rd Annual IEEE Symposium on Foundations of Computer Science, 2002.
Horowitz et al., "Fundamentals of Data Structures in C", 2008, W. H. Freeman and Company, cover and Chapter 5.6 "Heaps" pp. 217-225 and Chapter 7.7 "Heap Sort" pp. 347-352.

* cited by examiner

*Primary Examiner* — Jensen Hu
(74) *Attorney, Agent, or Firm* — H.C. Park & Associates, PLC

(57) ABSTRACT

The present invention relates to an algorithm that retrieves only k data elements having the largest (or smallest) key values from a dataset (i.e., top-k results) in a time linearly proportional to the size of the dataset. The proposed method using the algorithm finds the top-k results using a k-sized min (or max) heap structure that maintains candidate elements of the top-k results by scanning all data elements in the dataset only once. In other words, the present invention provides a linear-time top-k sort method that finds top-k results in a time linearly proportional to the size of the dataset (i.e., O(n) time complexity), while conventional sort algorithms for finding top-k results cannot find the top-k results in a time linearly proportional to the size of the dataset (i.e., at least O(n log n) time complexity).

14 Claims, 2 Drawing Sheets

LINEAR-TIME TOP-K SORT METHOD

CROSS-REFERENCES TO RELATED APPLICATIONS

This patent application claims priority from and the benefit of Korean Patent Application No. 10-2011-0037332, filed on Apr. 21, 2011, which is hereby incorporated by reference for all purposes as if fully set forth herein.

BACKGROUND OF THE INVENTION

1. Field of the Invention

The invention relates to a linear-time top-k sort method, and more specifically, to an algorithm that retrieves only k elements (i.e., top-k results) having the largest (or smallest) key values from a dataset in a sorted order in a time proportional to the dataset size.

2. Description of the Related Art

Recently, wide use of Internet and the convergence of digital technologies have is caused a significant increase in the amount of data that need to be processed by application systems with limited resources.

In particular, in Web and multimedia search systems or distributed systems that deal with a huge amount of data, it is sometimes difficult to process a large number of user queries due to the drastic increase of the amount of the query results. Accordingly, efficient query (or search) processing on a vast amount data has become a very important issue.

Hence, top-k query processing, which returns the highest-ranked k answers (or top-k results) from a dataset according to the importance, is useful in the problems mentioned above.

Accordingly, top-k query processing has been studied actively in a variety of areas such as Web and multimedia search systems and distributed systems, which deal with a vast amount of data. Ilyas et al. summarize the studies in "A Survey of Top-k Query Processing Techniques in Relational Database Systems," Ilyas, I., Beskales, G., and Soliman, M., ACM Computing Surveys, Vol. 40, No. 4, Article 11, 2008 ('Related Art 1').

Conventional methods of top-k query processing can also be found in "Algorithms in C++," Sedgewick, R., Addison Wesley, 1992 ('Related Art 2'). Although top-k results can be obtained by using conventional sort algorithms described in 'Related Art 2' such as insertion, bubble, merge, heap, and quick sort algorithms, those algorithms should sort the entire data according to their key values.

As an example, according to "Fundamentals of Data Structures in C++," Horowitz, E., Sahni, S, and Mehta, D., W. H. Freeman and Company, 1995 ('Related Art 3'), the smallest time complexity of existing sort algorithms for n data elements is $O(n \log n)$, and thus, top-k query processing using these algorithms must have an $O(n \log n)$ time complexity. This means is that we cannot obtain top-k results by using those algorithms in linear time, and thus, we can hardly apply them to the latest applications such as Web search and sensor networks, which deal with a huge amount of data.

More specifically, for example, the time complexity of the heap sort algorithm is $O(n \log n)$ as described in 'Related Art 3'. For n data elements, the algorithm sorts all the elements in the ascending (or descending) order by the following two steps: 1) insert all the elements to an n-sized min (or max) heap structure, and 2) extract the element from the heap structure one by one.

Since the heap sort algorithm has an $O(n \log n)$ time complexity, top-k query processing using heap sort has an $O(n \log n)$ time complexity as well. We, hence, cannot obtain top-k results in linear time, i.e., in a time proportional to the size of the dataset. Accordingly, we can hardly apply the heap sort algorithm to the applications such as Web search or distributed systems, which deal with a huge amount of data.

In order to efficiently process the latest applications such as Web and multimedia search systems or distributed systems that deal with a vast amount of data, it is important to find top-k results in linear time. Hence, as an efficient top-k query processing method, it is desirable to provide a linear-time top-k sort algorithm that has a time complexity linear in the number of data elements, n, instead of existing sort algorithms. However, any method satisfying this requirement has not been proposed yet.

SUMMARY OF THE INVENTION

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

The objective of the present invention is to provide an efficient algorithm that retrieves only k data elements having the largest (or smallest) key values in the descending (or ascending) order from a dataset of n data elements having key values in a linear time (i.e., $O(n)$ time complexity) in place of expensive conventional sort algorithms having $O(n \log n)$ time complexities as mentioned in 'Related Art 2'.

More specifically, the objective of the present invention is to provide a linear-time top-k sort method that retrieves only k data elements having the largest (or smallest) key values in a time proportional to the size of dataset, n. The method compares the key value of a new data element with that of the root node of a min (or max) heap structure whose size is a constant k, and readjusts the heap structure to maintain candidate top-k results in the structure.

In one embodiment, in order to perform top-k query processing, which finds the highest-ranked k (or top-k) results in the order of importance, in search or distributed systems that handle a vast amount of data, a linear time top-k sort method is provided. The method retrieves k data elements having the largest key values from a dataset consisting of n data elements in a time proportional to the size of the dataset (i.e., linear time). The method is composed of nine steps as follows. In the first step, it reads k data elements from the entire dataset S, which consists of n data elements, and removes them from S so as not to be read again (Step 1). In the second step, the method initializes a min heap structure, which we call top-KHeap, as an empty tree to be returned as the query results, and constructs the min heap structure by inserting the k data elements that are read in Step 1 to topKHeap (Step 2). The method extracts a data element e from S in sequence (Step 3), and compares the key value of e with that of the root is node r of topKHeap (Step 4). In the case that the key value of e is larger than that of r, the method replaces r with e (Step 5). It readjusts topKHeap so that the key value of the parent node is smaller than or equal to the key values of its children nodes if the key value of the replaced root node in Step 5 is larger than that of the key values of its children nodes (Step 6). It then removes e from S (Step 7). Five Steps from Step 3 to Step 7 are iterated until S becomes an empty set (Step 8). When S becomes an empty set, topKHeap, the min heap structure that contains only k elements having the largest key values, is returned as the top-k query results (Step 9). The time complexity of the method is sums of 1) the time to construct the initial heap structure with k elements ($O(k \log k)$), 2) the time to reconstruct the heap with n−k elements (O((n−k)log k)), and 3) the time to extract and return the k elements (O(k log k)) as the top-k results. It is expressed as $O(c_1 k \log k + c_2 k \log k + (n-k) \log k) = O((n+ck) \log k)$, where c, $c_1$, and $c_2$ are constants, and $c = c_1 + c_2 - 1$. Since c and k are constants, the time complexity of the method becomes $O((n+ck) \log k) = O(n)$. This means that our method is a linear time top-k sort method whose time complexity is linearly proportional to the size of dataset (n).

In the method, all steps such as reading data elements of the input dataset S or removing the elements read from S are executed during one scan of data elements, which are stored at storage devices such as disks.

In Step 2, the method constructs an initial min heap structure with k elements read in Step 1, and this step has an O(k log k) time complexity. Step 2 iterates the following two sub-steps k times: 1) inserting an element into the terminal node of the min heap structure and 2) adjusting the heap structure along all paths from the newly-inserted node to the root node so as to make the key value of parent node to be less than or equal to key values of its children node.

In Step 4, the method jumps to Step 7 and removes the element e from the dataset S if the key value of e is less than that of the root node r.

If the key value of the parent node is larger than those of its children nodes, the method, in Step 6, readjusts topKHeap so that it satisfies the constraints of a min heap structure (i.e., the key value of the parent node should be less than or equal to those of its children nodes). The readjustments are repeated for every node pair having parent/child relationship in topKHeap.

Step 8 represents n−k repetitions from Steps 3 to 7 where, n is the size of dataset, and k is the elements read in Step 1 for constructing initial topKHeap.

Step 9 represents that the method extracts k elements of topKHeap in the ascending order, and then, reads them in a reversed order of the extraction so as to access the first element whose key value is the largest.

In one embodiment, in order to perform top-k query processing, which finds the highest-ranked k (or top-k) results in the order of importance, in search or distributed systems that handle a vast amount of data, a linear time top-k sort method is provided. The method retrieves k data elements having the smallest key values from a dataset consisting of n data elements in a time proportional to the size of the dataset (i.e., linear time). The method is composed of nine steps as follows. In the first step, it reads k data elements from the entire dataset S, which consists of n data elements, and removes them from S not so as to be read again (Step 1). In the second step, the method initializes a max heap structure, which we call topKHeap, as an empty tree to be returned as the query results, and constructs the max heap structure by inserting the k data elements that are read in Step 1 to topKHeap (Step 2). The method extracts a data element e from S in sequence (Step 3), and compares the key value of e with that of the root node r of topKHeap (Step 4). In the case that the key value of e is smaller than that of r, the method replaces r with e (Step 5). It readjusts topKHeap so that the key value of the parent node is larger than or equal to the key values of its children nodes if the key value of the replaced root node in Step 5 is smaller than that of the key values of its children nodes (Step 6). It then removes e from S (Step 7). Five Steps from Step 3 to Step 7 are iterated until S becomes an empty set (Step 8). When S becomes an empty set, topKHeap, the max heap structure that contains only k elements having the smallest key values, is returned as the top-k query results (Step 9). The time complexity of the method is sums of 1) the time to construct the initial heap structure with k elements (O(k log k)), 2) the time to reconstruct the heap with n−k elements (O((n−k)log k)), and 3) the time to extract and return the k elements (O(k log k)) as the top-k results. It is expressed as $O(c_1 k \log k + c_2 k \log k + (n-k) \log k) = O((n+ck) \log k)$, where c, $c_1$, and $c_2$ are constants, and $c = c_1 + c_2 - 1$. Since c and k are constants, the time complexity of the method becomes $O((n+ck) \log k) = O(n)$. This means that our method is a linear time top-k sort method whose time complexity is linearly proportional to the size of dataset (n).

In the method, all steps such as reading data elements of the input dataset S or removing the elements read from S are executed during one scan of data elements, which are stored at storage devices such as disks.

In Step 2, the method constructs an initial maximum heap structure with k elements read in step 1, and this step has an O(k log k) time complexity. Step 2 iterates the following two sub-steps k times: 1) inserting an element into the terminal node of the max heap structure and 2) adjusting the heap structure along all paths from the newly-inserted node to the root node so as to make the key value of parent node to be larger than or equal to key values of its children nodes.

In Step 4, the method jumps to Step 7 and removes the element e from the dataset S if the key value of e is larger than that of the root node r.

If the key value of the parent node is less than those of its children nodes, the method, in Step 6, readjusts topKHeap so that it satisfies the constraints of a max heap structure (i.e., the key value of the parent node should be larger than or equal to those of its children nodes). The readjustments are repeated for every node pair having parent/child relationship in topKHeap.

Step 8 represents n−k repetitions from Steps 3 to 7 where, n is the size of dataset, and k is the elements read in step 1 for constructing initial topKHeap.

Step 9 represents that the method extracts k elements of topKHeap in the descending order, and then, reads them in a reversed order of the extraction so as to access the first element whose key value is the smallest.

In another embodiment, a program for executing a linear-time top-k sort method explained above is provided.

In another embodiment, a computer-readable recording medium for storing the program that executes the linear-time top-k sort method explained above is provided.

In one embodiment, the liner-time top-k sort method, which finds top-k results from a huge amount of data efficiently compared with the convectional sort algorithms, is provided. Since the method has O(n) time complexity, its execution time increases linearly in the size of the dataset (n). This property solves the inefficiency problem of the conventional sort algorithms that have O(n log n) time complexities.

In one embodiment, if the heap data structures are used for storing and retrieving top-k results, their required space is much less than those of the conventional sort algorithms such as the heap sort algorithm.

More specifically, the method reduces storage space for maintaining top-k results is drastically since it needs a constant amount of storage space (i.e., O(k)) regardless of the size of the dataset, while conventional sort algorithms need storage space whose size is proportional to the size of dataset (i.e., O(n)).

In one embodiment, the method is applicable to the commercialization of the method itself or to the development of large-scale Web search engines and distributed systems that support top-k results. It is expected to enhance the performance of those systems significantly.

BRIEF DESCRIPTION OF THE DRAWINGS

The above and/or other aspects of what is described herein will be more apparent by describing certain exemplary embodiments with reference to the accompanying drawings, in which.

DETAILED DESCRIPTION OF THE EMBODIMENT

Figure 1:
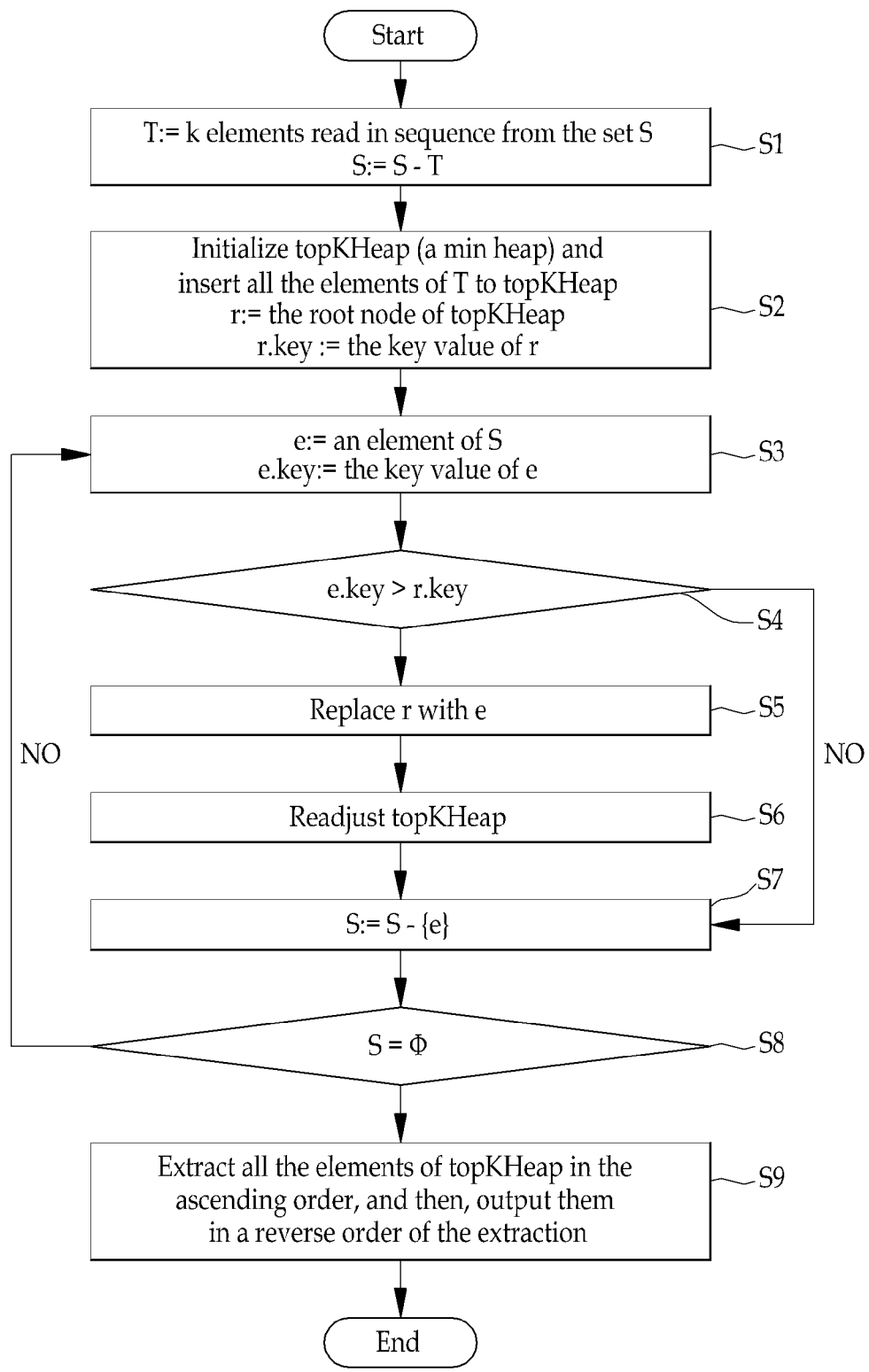
FIG. 1 is a flowchart illustrating the method for retrieving only k elements having the largest key values, as an embodiment of the execution of the linear-time top-k sort method.

Features and advantages of the present invention will be more clearly understood by the following detailed description of the present preferred embodiments by reference to the accompanying drawings. It is first noted that terms or words used herein should be construed as is meanings or concepts corresponding with the technical spirit of the present invention, based on the principle that the inventors can appropriately define the concepts of the terms to best describe their own invention. Also, it should be understood that detailed descriptions of well-known functions and structures related to the present invention will be omitted so as not to unnecessarily obscure the important point of the present invention.

Throughout the description, the importance or weight of a data element is represented by its value or by the result of a user-specified or system-specified function. Without loss of generality, we regard the key value of a data element as its importance. Accordingly, top-k results consist of k data elements having the largest (or smallest) key values from the dataset.

In one embodiment, we use a heap structure that maintains k data elements having the largest (or smallest) key values from the dataset (i.e., top-k results). It is a complete tree structure ('Related Art 3'), and can be used to implement a priority queue.

More specifically, the heap structure can be classified into a max heap structure (Max Heap) and a min heap structure (Min Heap). In Max Heap, the key value of a parent node is no less than those of its children nodes, and thus, the data element having the largest key value is assigned to the root node of the structure. In Min Heap, on the other hand, the key value of a parent node is no larger than those of its children nodes, and thus, the data element having the smallest key value is assigned to the root node of the structure.

We can consider using the conventional heap sort method to find k data elements having the largest (or smallest) key values from a dataset. The heap sort method constructs the Max (or Min) Heap by retrieving all the data elements (i.e., n data elements) rather than k elements.

In the construction of the heap structure above, a new data element is inserted into is the terminal node of the heap structure. Then, the method compares the key value of the terminal node with that of its parent node and applies this comparison to every node having parent/child relationship in the heap structure making the key value of the parent node to be larger (or less) than those of its children nodes.

The step explained above is called 'AdjustHeap'. After executing AdjustHeap for each of n data elements, the method extracts k data elements from the root node that has the data element having the largest (or smallest) key value one by one. As each of k data element is extracted, the heap structure is re-adjusted to satisfy the constraint of the Max (or Min) Heap.

The step explained above is called 'ReadjustHeap'. In ReadjustHeap, after removing the root node, the right-most terminal node is moved to the root node temporally. This step is called 'replaceHeap'.

Then, the key value of the parent node is compared with those of its children nodes for every parent-child node pair from the root node to the terminal node so as to make the key value of the parent node no less (or larger) than those of its children nodes.

The heap sort method for retrieving k data elements having the largest (or smallest) key values has the time complexity that is proportional to the number of comparisons between a parent node and its child node for every parent-child node pair from the root node to the terminal node of the heap structure.

Accordingly, the conventional heap sort method for finding top-k results has O(n log n) time complexity, which is derived from multiplying the size of the dataset (n) by the height of the heap structure (log n).

As explained above, the conventional sort methods are not appropriate for finding k data elements having the largest (or smallest) key values from a dataset since its time is complexity is not linearly proportional to the size of the dataset. Hence, they are not appropriate for applications that support top-k queries in a large-scale dataset.

On the other hand, in one embodiment, the present invention proposes a new method that is appropriate for applications that find top-k results from large-scale datasets because its time complexity is linearly proportional to the size of a dataset.

More specifically, the Linear-Time Top-k Sort method (LT-Method in short) proposed in this invention finds only k data elements having the largest (or smallest) key values from a dataset S consisting of n data elements in the time proportional to the size of S (i.e., n).

Furthermore, the LT-Method can use any of the k sized data structures, such as a priority queue, a max heap, or a min heap, to store top-k results. In the following explanation about the embodiment, however, without loss of generality, we compare the performance of the LT-Method with that of the well-known heap sort method assuming that the Max (or Min) Heap is used in the LT-Method as in the case of 'Related Art 3'.

The performance of the LT-Method proposed in the present invention is explained in terms of the space and the time complexities.

First, we analyze the space complexity of the LT-Method. In order to find k data elements having the largest (or smallest) key values from a set of n data elements, the LT-Method uses a k-sized Min (or Max) Heap, while a conventional heap sort method uses an n-sized (n>>k) Max (or Min) Heap because it should construct the heap structure with the entire data.

Accordingly, the LT-Method has a constant space complexity, i.e., O(k), while the conventional heap sort method has the space complexity that is proportional to the size of the dataset, i.e., O(n).

Therefore, the LT-Method in the present invention reduces the size of the storage space for maintaining the top-k results compared with the conventional heap sort method.

Second, we analyze the time complexity of the LT-Method. Since the LT-Method has O((n+ck)log k) time complexity, the top-k query processing time using the LT-Method is linearly proportional to n. However, the top-k query processing time using the conventional heap sort method is not linearly proportional to n because the time complexity of the heap sort algorithm is O(n log n).

Accordingly, the LT-Method is appropriate for the latest applications that process large-scale data.

The LT-Method with the characteristics according to an embodiment above will be explained in more detail with figures attached.

FIG. 1 is a flowchart illustrating the method that retrieves k data elements having the largest key values.

Figure 2:
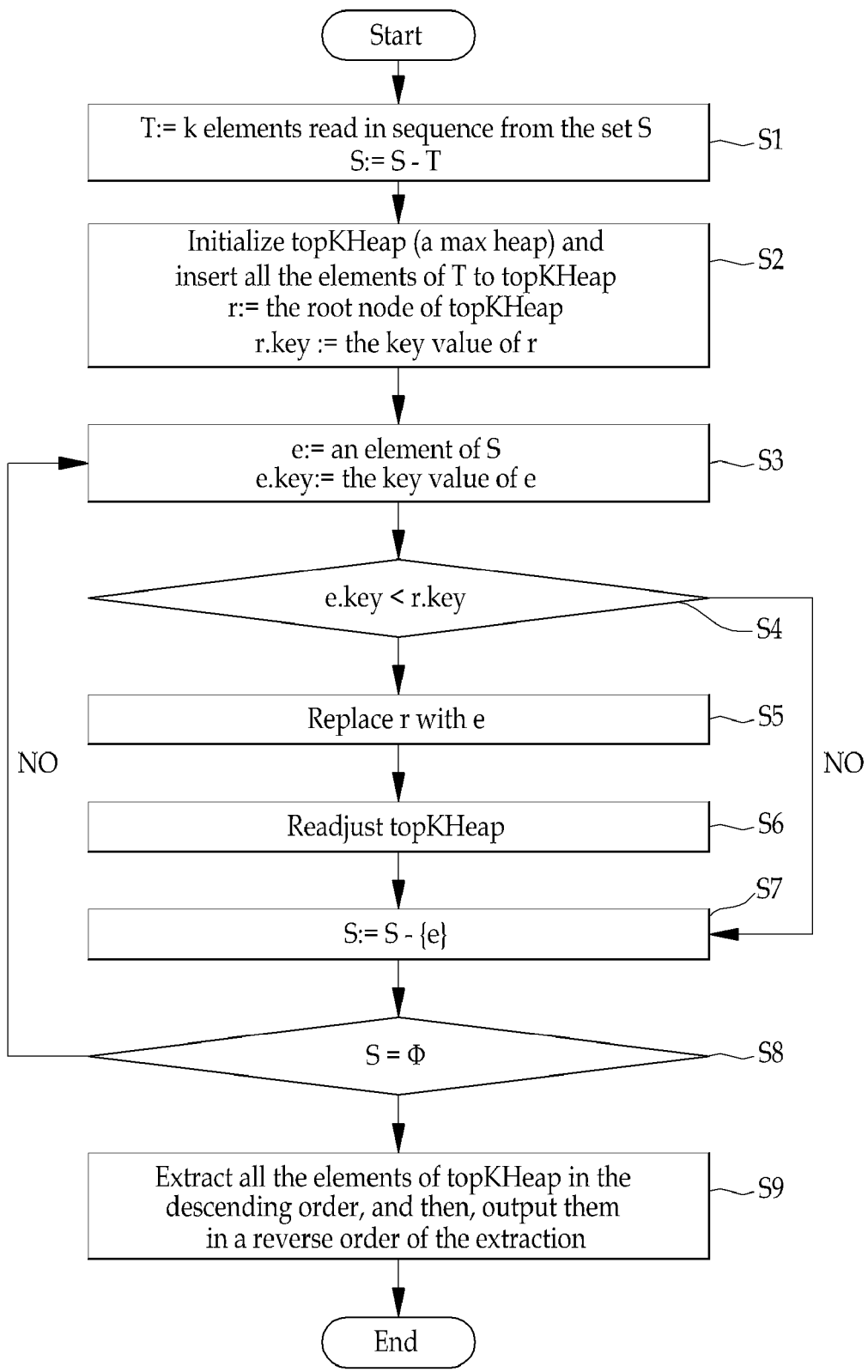
FIG. 2 is a flowchart illustrating the method for retrieving only k elements having the smallest key values, as an embodiment of the execution of the linear-time top-k sort method.

FIG. 2 is a flowchart illustrating the method that retrieves k data elements having the smallest key values.

First, FIG. 1 is explained in detail. In S1, k data elements are read from the entire set S consisting of n data elements. Then, the k data elements read are removed from S in order not to be retrieved again.

In implementing the LT-Method according to an embodiment, the program codes that read data elements in S and remove the data elements read from S can be easily implemented by scanning only once the data elements stored in storage devices, such as disks, in the order of the data stored.

In S2, topKHeap, which is a min heap structure to be returned as the top-k results, is initialized as an empty tree. Then, topKHeap is constructed with the k data elements read from S1.

topKHeap is constructed by the step AdjustHeap explained above. Hence, the time complexity of constructing topKHeap with k data elements is O(k log k). The root node of topKHeap and its key value are represented as 'r' and 'r.key', respectively.

In S3, an element 'e' is selected from S, and its key value is represented as 'e.key'.

In S4, e.key is compared with r.key. Since LT-Method according to an embodiment uses the min heap structure, r.key is less than or equal to the key values of the other k−1 data elements in topKHeap.

Therefore, if e.key is larger than r.key, r cannot be included in top-k results. In this case, r is replaced with e in S5.

If e.key is equal to r.key, it is possible to replace r with e or discard e. In a specific embodiment explained herein, e is discarded.

topKHeap whose root node r is replaced with e in S5 might not satisfy the constraint of the min heap structure, i.e., the constraint that the key value of the parent node must be less than or equal to those of its children.

In S6, the violation of the constraint is resolved by the step ReadjustHeap explained above.

More specifically, after comparing the key value of the replaced root node with those its children nodes, topKHeap is readjusted so that a data element whose key value is less than those of the other data elements may become the parent node.

Since the step ReadjustHeap is executed repeatedly for every node pair having parent-child relationship from the root node to terminal node, the time for the step ReadjustHeap is proportional to the height of topKHeap, which is a complete tree ('Related Art 3') with k (a constant value) data elements, i.e., O(log k).

On the other hand, if e.key is less than r.key, e cannot be included in top-k results. In this case, e is discarded in S7.

In other words, e is removed from S in order not to be read again as explained in S1.

In S8, the condition for termination of the LT-Method is checked. That is, a series of the steps from S3 to S8 is repeated until there is no data element left to read, i.e., S becomes an empty set.

Accordingly, a series of the steps described above is repeated n−k times, where n is the number of data elements, and k is the data elements used for constructing initial topKHeap.

Finally in S9, topKHeap, which contains k data elements having the largest key values, is returned as the result of the LT-Method.

In order to access the k data elements in the order of their key values, especially with the largest first, the k data elements are extracted in the order of their key values, but with the smallest first, and then, they are read in the reversed order of the extraction. As a result, this step has O(k log k) time complexity.

A method that finds k data elements having the smallest key values from the set consisting of n data elements can be easily implemented with a few modifications to the LT-Method explained as follows.

The LT-Method that finds k data elements having the smallest key values from a set of n data elements is described in detail, referring to FIG. 2.

For the simplicity of explanation, overlapping parts with FIG. 1 are omitted to explain, and only the different parts are explained.

Referring to FIG. 2, a max heap structure (topKHeap) is used for storing k data elements. In S2, the step AdjustHeap is executed during initial topKHeap construction.

In S4, if e.key is larger than r.key, then e discarded. However, if e.key is less than r.key, then r is replaced with e.

Finally in S9, the k data elements are extracted in the order of their key values, especially with the largest first, by executing the step ReadjustHeap, and then, they are read in the reversed order of the extraction.

Furthermore, the time complexity of the LT-Method according to the embodiments is expressed as the sum of the time to construct an initial heap structure with k data elements (O(k log k)), the time to readjust the heap structure with n−k data elements (O((n−k)log k)), and the time to extract the resulting k data elements.

Accordingly, the time complexities of the two LT-Methods are $O(c_1 k \log k + c_2 k \log k + (n-k)\log k) = O((n+ck)\log k)$ for constants $c$, $c_1$, and $c_2$ ($c=c_1+c_2-1$).

Since c and k are constants, the LT-Method has O((n+ck) log k)=O(n) time complexity. Hence, the method is linearly proportional to the size of a dataset n.

Accordingly, a linear time top-k sort method can be implemented as described above. The LT-Methods have following advantages.

That is, the time complexity of the LT-Method according to the embodiment is linearly proportional to the size of a dataset n (i.e., O(n)) while those of the methods using conventional sort algorithms are not (i.e., O(n log n)). Hence, it is not appropriate to use conventional sort methods for finding top-k results from a large-scale dataset.

Therefore, by using the linear time top-k sort method according to the embodiment, top-k results can be more efficiently retrieved from a vast amount of data compared with the conventional methods using sort algorithms.

Furthermore, if a heap structure is used in the LT-Method, the method drastically reduces the storage space for storing top-k results compared with the conventional heap sort method.

In other words, the LT-Method as an embodiment of the present invention requires a constant-sized storage space only, i.e., O(k) for maintaining the heap structure while the storage space of the conventional heap sort method is linearly proportional to the size of a dataset n, i.e., O(n).

Although the embodiments have been explained so far regarding the linear-time Top-k sort algorithm, the technical concept of the invention is not limited to the embodiments provided herein.

That is, although the methods are explained as embodiments of the present invention, this invention can be provided as computer programs including the methods explained above, as storage medium that records those programs, and as devoted hardware devices that execute those programs.

The foregoing exemplary embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. A Linear-Time Top-k Sort Method that finds k data elements having the largest key values from a dataset of n elements in a time linearly proportional to the size of the dataset so as to process top-k queries that retrieve only the highest-ranked k results arranged in the order of importance in large-scale search systems or distributed systems comprises the following steps;
   reading k data elements in sequence from a dataset S of n data elements, and removing those k data elements from S so as not to be read again (Step 1);
   initializing a min heap structure topKHeap, which will be returned as the result of the proposed method, as an empty tree, and constructing topKHeap by inserting the k data elements read in Step 1 into topKHeap (Step 2);
   extracting a data element e from the dataset S (Step 3);
   comparing the key value of the element e extracted in Step 3 with the key value of the root node r of topKHeap (Step 4);
   replacing the key value of the root node r with the element e if the key value of e is larger than that of r (Step 5);
   comparing the key value of the root node r that is replaced in Step 5 with key values of its children nodes, and readjusting topKHeap so that the key value of the parent node is no larger than the key values of its children nodes (Step 6);
   removing the element e from the dataset S (Step 7);
   repeating Steps 3 to 7 until the dataset S becomes empty so that there is no element left to be read (Step 8);
   returning topKHeap, which consists of the data elements having the largest key values, as a result when the dataset S becomes empty (Step 9),
   where in Step 9, returning the k data elements stored in topKHeap in the descending order of those key values 1) by extracting the k data elements from the root node of topKHeap and 2) by reading them in the reverse order of the extraction, wherein
   the time complexity of the method is represented as a sum of the time for initializing topKHeap using k data elements initially selected ($O(k \log k)$), the time for reconstructing topKHeap with the other (n−k) data elements ($O((n-k)\log k)$), and the time for returning the k data elements in the descending order, resulting in $O(c_1 k \log k + c_2 k \log k + (n-k)\log k) = O((n+ck)\log k)$ ($c=(c_1+c_2-1)$) with respect to constants c, $c_1$ and $c_2$, wherein
   since c and k are constants, the time complexity becomes $O((n+ck)\log k) = O(n)$ so that the time complexity of the method is linearly proportional to the number of all data elements (i.e., n) of the dataset.

2. The method of claim 1, wherein all the processing that includes reading data elements in the dataset S and removing them from S are executed in linear time by scanning once the set of data elements stored in a storage device such as a disk.

3. The method of claim 1, wherein Step 2 constructs the initial topKHeap in $O(k \log k)$ time by 1) inserting a new element as a terminal node of topKHeap; 2) comparing key values of nodes having parent/child relationships along all paths from the newly-inserted node to the root node; and 3) adjusting topKHeap so that the key value of a parent node is no larger than the key values of its children nodes.

4. The method of claim 1, wherein Step 4, moving directly to Step 7 to remove the element e if the key value of e is less than that of the root node r.

5. The method of claim 1, wherein Step 6 performs the ReadjustHeap step so that topKHeap satisfies the constraints of a min heap structure, that the key value of the parent node must be no larger than those of its children nodes, when the constraints are not satisfied,
   wherein the ReadjustHeap step is repeated for all nodes having a parent/child relationship from the terminal nodes to the root node.

6. The method of claim 1, wherein Step 8 repeats Steps 3 to 7 as many times as (n−k), where (n−k) represents the number of data elements except k data elements read in Step 1.

7. A Linear-Time Top-k Sort Method that finds k data elements having the smallest key values from a dataset of n elements in a time linearly proportional to the size of the dataset so as to process top-k queries that retrieve only the highest-ranked k results arranged in the order of importance in large-scale search systems or distributed systems comprises the following steps;
   reading k data elements in sequence from a dataset S of n data elements, and removing those k data elements from S so as not to be read again (Step 1);
   initializing a max heap structure topKHeap, which will be returned as the result of the proposed method, as an empty tree, and constructing topKHeap by inserting the k data elements read in Step 1 into topKHeap (Step 2);
   extracting a data element e from the dataset S (Step 3);
   comparing the key value of the element e extracted in Step 3 with the key value of the root node r of topKHeap (Step 4);
   replacing the key value of the root node r with the element e if the key value of e is smaller than that of r (Step 5);
   comparing the key value of the root node r that is replaced in Step 5 with key values of its children nodes, and readjusting topKHeap so that the key value of the parent node is no smaller than the key values of its children nodes (Step 6);
   removing the element e from the dataset S (Step 7);
   repeating Steps 3 to 7 until the dataset S becomes empty so that there is no element left to be read (Step 8);
   returning topKHeap, which consists of the data elements having the smallest key values, as a result when the dataset S becomes empty (Step 9),
   where in Step 9, returning the k data elements stored in topKHeap in the ascending order of those key values 1) by extracting the k data elements from the root node of topKHeap and 2) by reading them in the reverse order of the extraction, wherein
   the time complexity of the method is represented as a sum of the time for initializing topKHeap using k data elements initially selected ($O(k \log k)$), the time for reconstructing topKHeap with the other (n−k) data elements ($O((n-k)\log k)$), and the time for returning the k data elements in the ascending order, resulting in $O(c_1 k \log$ $k+c_2 k \log k+(n-k)\log k = O((n+ck)\log k)$ $(c=(c_1+c_2-1))$ with respect to constants $c$, $c_1$ and $c_2$, wherein since $c$ and $k$ are constants, the time complexity becomes $O((n+ck)\log k)=O(n)$ so that the time complexity of the method is linearly proportional to the number of all data elements (i.e., n) of the dataset.

8. The method of claim 7, wherein all the processing that includes reading data elements in the dataset S and removing them from S are executed in linear time by scanning once the set of data elements stored in a storage device such as a disk.

9. The method of claim 7, wherein Step 2 constructs the initial topKHeap in $O(k \log k)$ time by 1) inserting a new element as a terminal node of topKHeap; 2) comparing key values of nodes having parent/child relationships along all paths from the newly-inserted node to the root node; and 3) adjusting topKHeap so that the key value of a parent node is no smaller than the key values of its children nodes.

10. The method of claim 7, wherein Step 4, moving directly to Step 7 to remove the element e if the key value of e is larger than that of the root node r.

11. The method of claim 7, wherein Step 6 performs the ReadjustHeap step so that topKHeap satisfies the constraints of a max heap structure, that the key value of the parent node must be no smaller than those of its children nodes, when the constraints are not satisfied, wherein the ReadjustHeap step is repeated for all nodes having a parent/child relationship from the terminal nodes to the root node.

12. The method of claim 7, wherein Step 8 repeats Steps 3 to 7 as many times as (n-k), where (n-k) represents the number of data elements except k data elements read in Step 1.

13. A non-transitory computer-readable storage medium comprising a computer executable program that when executed performs the linear-time top-k sort method of claim 1.

14. A non-transitory computer-readable storage medium comprising a computer executable program that when executed performs the linear-time top-k sort method of claim 7.

* * * * *